C. C. HOWELL.
BELT FASTENING DEVICE.
APPLICATION FILED AUG. 23, 1913.
1,105,273.  Patented July 28, 1914.
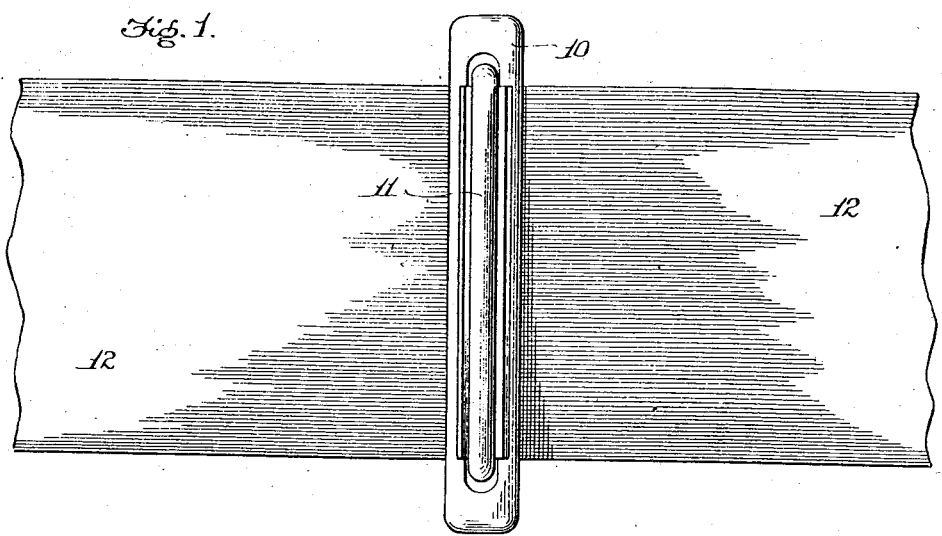
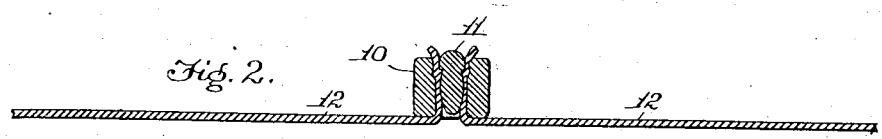
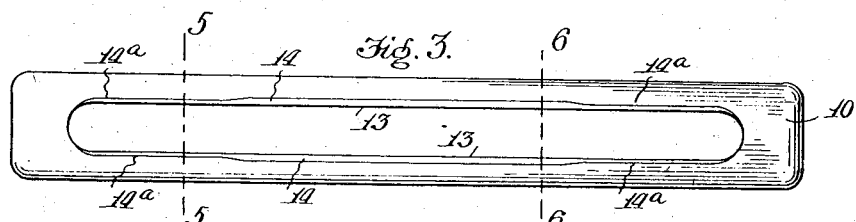
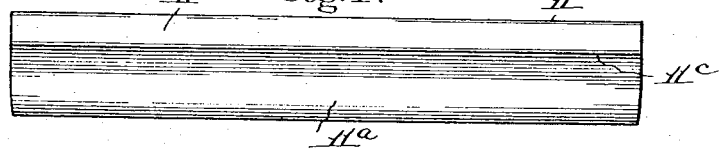
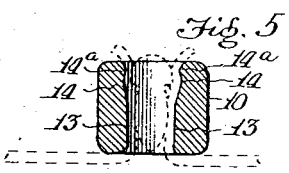
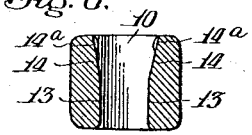
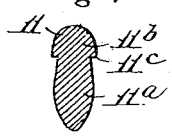
Witnesses  
J. E. Beall  
W. S. Duvall
Inventor:  
C. C. Howell.  
By John D. Thomas & Co.  
Attorneys.

UNITED STATES PATENT OFFICE.

CHARLES C. HOWELL, OF RED ROCK, PENNSYLVANIA.

BELT-FASTENING DEVICE.

1,105,273.  Specification of Letters Patent.  Patented July 28, 1914.

Application filed August 23, 1913. Serial No. 786,283.

*To all whom it may concern:*

Be it known that I, CHARLES C. HOWELL, a citizen of the United States, residing at Red Rock, in the county of Luzerne and State of Pennsylvania, have invented a Belt-Fastening Device, of which the following is a full and complete specification.

My invention is an improvement in belt-fasteners, and relates more especially to that particular class in which the ends of the belt are connected by a clamping device of such construction and application as to obviate the necessity of puncturing the ends of the belt to receive such fastening means as bolts or screws.

The primary object of my present invention is to provide a clamping device by means of which the ends of the belt are firmly and securely connected together, and in which the operation of connecting and disconnecting the ends of the belt may be effected easily and quickly so that one belt may be substituted for another without loss of time.

A further object of my invention is to provide a clamping device for connecting the ends of a belt of such particular construction as to insure a positive engagement with the ends of the belt without injuring the same.

In the present instance my improved belt fastening or clamping device consists of a metal loop in connection with a wedge-plate fitting therein between the inserted ends of the belt; the opening in the loop and configuration of the wedge-plate co-acting in a manner to insure a positive and secure frictional or binding engagement with the ends of the belt, all as hereinafter fully described and specifically pointed out in the appended claim.

In the accompanying drawings, forming a part of this specification: Figure 1 is a plan view, illustrating the application of my invention. Fig. 2 is a longitudinal sectional view through the fastening device and ends of the belt connected thereto. Fig. 3 is an enlarged detail plan view of the metal loop. Fig. 4 is an enlarged detail side view of the wedge-plate. Fig. 5 is a transverse sectional view through the metal loop, on the line 5—5 of Fig. 3. Fig. 6 is a similar view, on the line 6—6 of Fig. 3. Fig. 7 is a transverse sectional view through the wedge-plate.

Like numerals of reference indicate like parts in all the figures of the drawings.

In carrying out my invention I make the belt-fastener or clamping device of two parts, a closed metal loop 10, having a wedge-shape opening, and a wedge-plate 11; the latter being of such width and contour with relation to the width and shape of the opening in the metal loop that when the ends of the belt 12 are passed upward into the opening and the wedge-plate forced downward between said ends the parts will all be tightly clamped together. It will be understood that in the application of a belt-fastening device of this character the strain or pull upon the ends of the belt, respectively, in the operation of the belt, tends to effect a clamping action of the wedge-plate by drawing it down into the wedge-shape opening of the metal loop, and that the strain or pull is relieved when the slack of the belt comes upon that portion thereof having the fastening device. In other words, during the operation of the belt there is not a continuous pull upon the ends of the belt, respectively, to hold the wedge-plate securely in clamped position, and therefore the action of the clamping device must be positive so that the wedge-plate will not loosen up during the travel of the slack of the belt. Furthermore, the parts of the fastening device should not operate to puncture or injure the ends of the belt to such an extent as to weaken the same and cause either end to break when the strain or pull comes upon the belt.

In the present instance, therefore, it is the purpose of my invention to so construct or shape the parts of the clamping device that the ends of the belt will be engaged or fastened together in a positive manner, or practically locked, so that the wedge-plate will not loosen up but will at all times be held securely in clamped or binding engagement, and so that the binding engagement of the loop and plate on the ends of the belt will not injure or weaken the latter. To this end the lower portion of the opposite inner side walls of the opening in the metal loop converge only slightly, as indicated at 13, while the upper portion, 14, of said side walls are at a little greater inclination (see Fig. 6), and to coöperate with this shape opening in the metal loop the wedge-plate 11 is provided with a lower bulged portion 11ª, adapted to co-act with the lower part, 13, 13, of said opening, and a head 11ᵇ, adapted to co-act with the upper portion 14, 14, of said opening; in other words, each end of the belt is clamped between both the lower and upper portions of the metal loop and wedge-plate, it being understood, of course, that in practice the inclination of the walls 13 is only very slight, to insure the proper binding action of the wedge-plate upon the ends of the belt.

In order to provide a firm engagement or binding action between the clamping device and opposite side portions of the ends of the belt the metal loop is formed with small ribs 14ª, which extend for a short distance only from each end of the metal loop, to engage said side portions of the ends of the belt.

From the foregoing description, in connection with the accompanying drawings, the construction and operation of my invention will be readily understood, and it will be noted that I provide a belt-fastener in the form of a simple and effective clamping device of two parts, and that in applying said device it is only necessary to pass the ends of the belt up through the opening or slot in the metal loop and force the wedge-plate down between said ends sufficiently to bind thereon; the pull of the belt in operation serving to further bind or clamp the parts in locked engagement. To disconnect the ends of the belt pressure is exerted upon the lower or narrower edge of the wedge-plate to displace said wedge-plate. By the use of my improved belt-fastener or clamping device a change of belts may be made quickly and conveniently, and the ends of the belt securely fastened.

Having thus described my invention, I claim:

In a device for fastening the ends of belts, the combination of a metal loop having a wedge-shape opening or slot each side wall of which is pitched at a different inclination, said loop having ribs at the upper ends of the side walls extending for a short distance from each end of the loop, and a wedge-plate having a lower bulged portion and an upper head portion with shoulders at the lower ends of said head portion, as herein shown and for the purpose set forth.

CHARLES X C. HOWELL.
his mark

Witnesses:
F. B. HUGGINS,
S. D. FOLEY.